April 23, 1963     S. S. BROWN     3,087,102
DOOR LIFT ELECTRICAL CIRCUIT
Filed April 3, 1956
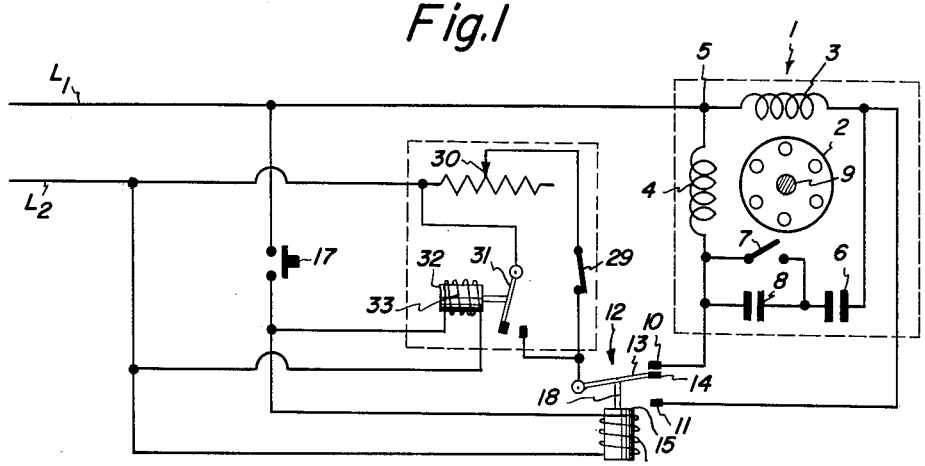
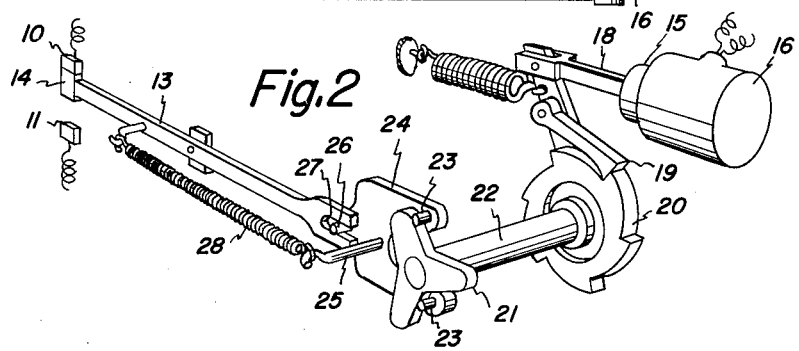
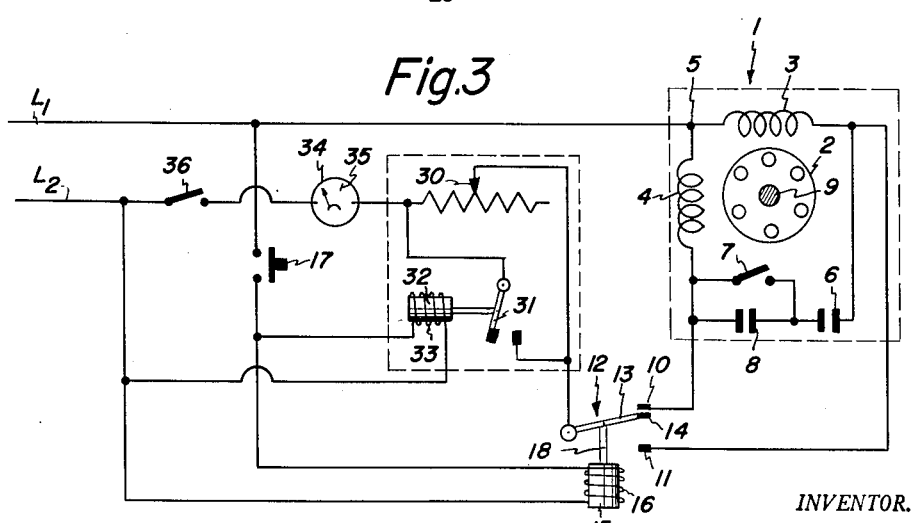
INVENTOR.
STEFFEN S. BROWN
BY
*Toulmin & Toulmin*
Attorneys 3,087,102
Patented Apr. 23, 1963

3,087,102
DOOR LIFT ELECTRICAL CIRCUIT
Steffen S. Brown, Dayton, Ohio, assignor to The Brown-Brockmeyer Company, Dayton, Ohio, a corporation of Ohio
Filed Apr. 3, 1956, Ser. No. 575,882
3 Claims. (Cl. 318—207)

This invention relates to an electrical control circuit for operating lift doors, more particularly to a circuit for disengaging the door drive motor whenever the door encounters any obstacle which impedes the movement of the door and imposes an overload above a predetermined quantity upon the drive motor.

It is the principal object of this invention to provide an improved electrical control circuit for lift doors.

It is another object of this invention to provide an electrical control circuit for lift doors wherein the necessity for limit switches and an adjustable clutch is eliminated.

It is a further object of this invention to provide a motor control circuit wherein the motor is deenergized whenever an overload on the motor slows the speed of the motor below a predetermined speed.

It is an additional object of this invention to provide an electrical control circuit for lift doors wherein the full torque of the drive motor is utilized in initiating movement of the door and a variable torque utilized by the drive motor during running conditions.

It is still another object of this invention to provide a method of operating a lift door circuit by utilizing the overload imposed on the drive motor whenever the movement of the door is impeded.

Other objects and advantages of this invention will become apparent upon reference to the accompanying description in conjunction with the following drawings wherein:

FIGURE 1 is a schematic electrical circuit diagram of the control circuit of this invention;

FIGURE 2 is a perspective view of a ratchet relay switch which is a component of the operating circuit shown in FIGURE 1; and FIGURE 3 is a schematic diagram of a modification of the operating circuit shown in FIGURE 1.

Returning now to the drawings and more particularly to FIGURE 1 wherein like reference symbols indicate the same parts throughout the various views, the drive motor of the control circuit is indicated at 1 and has a rotor 2, preferably of the squirrel-cage type. Two windings, 3 and 4, which are arranged in quadrature in the frame of the motor 1, are associated with the rotor. These windings are substantially equal wherein the windings may be interchanged as starting and running windings to reverse the motor. In other cases, however, where the reversal of the motor is not necessary, the windings will differ considerably as to wire size and number of turns.

The windings 3 and 4 have their ends interconnected at 5 and the interconnected ends are connected to a power line L-1. The other ends of the windings 3 and 4 are connected together to a serially connected starting condenser 6 and a switch 7. A condenser 8 is connected in parallel with the switch 7. The switch 7 is of the centrifugal type and is normally closed but set to open at a predetermined rotor speed. Other types of manual or relay switches may be used, if desired.

The rotor 2 is mounted upon a shaft 9 which is connected through suitable gearing, not shown, to the lift door which is to be operated. Thus the drive motor is directly connected to the work load. An adjustable clutch is not necessary. It is to be understood that other work loads may be substituted for the lift door.

The windings 3 and 4 are connected to the contacts 10 and 11, respectively. The contacts 10 and 11 are terminals in a solenoid operated ratchet switch, generally designated as 12.

The ratchet switch 12 comprises a pivotally mounted blade 13 which has a movable contact 14 on the extreme end thereof. The contact 14 is adapted to electrically engage either of the stationary contact terminals 10 and 11. The blade 13 is connected to an armature 15 which is energized by a solenoid coil 16 which is connected across the power lines L-1 and L-2 and in series with a normally open push-button switch 17.

The solenoid-operated ratchet switch 12 is shown in greater detail in FIGURE 2 where it can be seen that the armature 15 is connected with an arm 18 that carries a pawl 19 adapted for cooperating with the six tooth ratchet wheel 20. The ratchet wheel 20 is affixed to a three lobed cam 21 by a shaft 22, and the cam 21 engages between pins 23 on a fork 24 pivoted at 25. A pin 26 on the fork engages a slot 27 on the end of the movable blade 13 which is adapted for selective engagement between the contact terminals 10 and 11. A tension spring 28 is provided which will snap the blade 13 between two positions as the fork 24 rotates on its pivot due to the indexing cam 21 which is brought about by energization of the solenoid 16.

The movable blade 13 of the relay switch 12 is serially connected to a normally closed centrifugal switch 29 and a rheostat 30, which provides a variable resistance, to L-2 of the power supply.

A normally open switch 31 is connected in parallel with the centrifugal switch 29 and variable rheostat 30. The switch 31 is connected to an armature 32 which is actuated by a solenoid coil 33 which is connected across the lines L-1 and L-2 and in series with the push-button switch 17. Since the switch 31 is normally open, depressing the push button 17 will energize the solenoid coil 33 to close the switch during that period of time that the button is depressed.

The circuit, as illustrated in FIGURE 1, is shown after the drive motor 1 has attained running speed. Assuming that the motor is deenergized and the circuit is inoperative, the motor 1 is energized by momentarily closing the button switch 17. The closing of the switch 17 will immediately energize the solenoid coils 16 and 33. Energization of the coil 16 will result in operation of the ratchet relay switch and will cause the movable contact 14 to engage the stationary contact 10. This will establish an energizing circuit for the motor and rotation of the motor will initiate movement of the lift door. The winding 3 is now the running winding and the winding 4 which is in series with the closed centrifugal switch 7 and condenser 6 is the starting winding.

As the rotor comes up to speed, the centrifugal switch 7 will be opened and both of the condensers 6 and 8 will be serially connected with the winding 4 which will remain in the circuit of the motor. However, the current flow through the starting winding will be substantially reduced because of the serially connected condensers 6 and 8.

Returning now to the energization of the solenoid coil 33, this action will close the switch 31. The closing of the switch 31 will cut out the variable resistance from the motor circuit as long as the solenoid coil 33 is energized to maintain the switch 31 closed.

As the motor approaches running speed, the centrifugal switch 29 will be closed and the push button 17 may be released, which will cause the opening of the switch 31. The variable resistance will now be in circuit with the motor during running conditions.

Variable rheostat 30 is previously adjusted to determine the amount of current which is to flow through the motor during running conditions. The current will determine the overload torque on the motor.

The motor will continue to operate and to move the door until the door comes to either the top or bottom position. When the door reaches one of these extreme positions, the movement thereof will be stopped. Since the door is directly connected to the motor through suitable gearing, an overload will be immediately imposed upon the motor. This overload will immediately reduce speed of the motor. As soon as the speed of the motor drops below a predetermined amount, the centrifugal switch 29 will be opened. This will deenergize the motor circuit. It will be recalled that the switch 31 was opened when the push button 17 was released after the motor was started.

Currently with the opening of the centrifugal switch 29, the centrifugal switch 7 is closed so that the motor is ready to start again upon actuation of the push button 17.

When the push button 17 is next depressed, the motor will rotate in the opposite direction from its previous rotation, since the ratchet switch 12 will engage the movable contact 14 with the stationary contact 11. This will result in the winding 4 acting as the running winding and the winding 3 being connected in series with both of the condensers to act as the starting winding.

Thus, if the door has been open, the depressing of the push-button switch 17 will cause the door to close and vice versa.

Not only does this circuit operate when the end of travel of the door has been reached but also if the door should encounter any obstacle which would impede its movement. Should the door, in closing, encounter a portion of an automobile which is in its path, an overload will be immediately imposed upon the motor and the motor circuit will be deenergized in the manner as previously described.

The variable rheostat 30 may be set at such a point that the overload torque is only slightly above the torque necessary to operate the door during running conditions. Thus, very little pressure upon the door will be necessary to operate the control circuit and deenergize the motor.

In the case of heavy, unbalanced doors, the rheostat may be almost completely cut out of the circuit so that the motor has full overload torque during running conditions.

While the deenergization of the motor has been accomplished through the use of a centrifugal switch which is responsive to an overload imposed upon the motor, other modes of operation may be utilized in the circuit.

Proceeding to FIGURE 3, there is illustrated a modified electrical control circuit wherein the motor circuit is manually deenergized when an overload is imposed upon the motor. The overload is indicated upon an ammeter 34 which is serially connected in L-2 of the power supply line. The ammeter has a positionable indicator 35 which is correlated with the resistance cut out of the variable rheostat 30. Thus, when the overload torque is established upon the motor by adjusting the rheostat 30, the indicator 35 on the ammeter is correspondingly positioned.

When the operator of the electric circuit has energized the circuit, he watches the ammeter to see when the indicator needle reaches the position indicator 35. When the ammeter needle and the indicator 35 correspond, he immediately opens a manual throw switch 36 connected in the line L-2.

While not shown, it is possible for an experienced operator to listen to the motor during the operation thereof. Upon an overload being imposed upon the motor, he will audibly ascertain that the motor speed has decreased. At this point, he immediately opens the manual throw switch 36 to deenergize the motor circuit.

It is to be understood that other means may be readily employed to operate the control circuit other than those which are described above.

Thus, the present invention discloses an electrically-controlled circuit for lift doors wherein the circuit is characterized by having full starting torque in the motor when starting but a variable running torque by means of the rheostat which is connected in the motor circuit only during the running of the motor.

It will be understood that this invention is susceptible to modification in order to adapt it to different usages and conditions, and, accordingly, it is desired to comprehend such modifications within this invention as may fall within the scope of the appended claims.

I claim:

1. In a lift door electrical circuit, a reversible electric motor having a pair of angularly spaced similar windings, means for connecting alternately said windings as the running and starting windings respectively, a variable resistance, means for switching said variable resistance in circuit with said motor only when said motor attains running speed, and means responsive to a reduction in speed in said motor resulting from an overload imposed thereon by said lift door encountering an obstacle which impedes the movement thereof for deenergizing said motor.

2. In a lift door electrical circuit, a reversible electric motor having a pair of angularly spaced identical windings for operating the lift door, the corresponding sides of said windings being interconnected, a power supply line, means interconnecting the other sides of said windings and comprising a relay switch for connecting either of said windings across said power supply line as a running winding, a variable resistance connected in series with said motor, a normally open centrifugal switch between said variable resistance and said motor and closed at a predetermined speed to maintain said variable resistance in circuit with said motor during running conditions, a normally open switch in parallel with said variable resistance and said normally open centrifugal switch, said centrifugal switch connected to said motor whereby a reduction in motor speed caused by an overload on said motor will open said switch to deenergize said motor, a pair of coils across said power line, and a starting switch in circuit across said power line to deenergize the same, one of said coils actuating said open switch into the closed position during the starting of the motor, the other of said coils actuating said relay switch to connect one of said windings across said power supply line as the running winding.

3. In an electrical control circuit for a vertical lifting door, a reversible electric motor having a pair of angularly spaced similar windings, means for connecting alternately said windings as the running and starting windings respectively, means for establishing the torque curve for the motor to define the speed at which the motor will move the lift door, means for switching said torque-curve-establishing means in circuit with said motor only after said motor has attained running speed, and means responsive to the speed of the motor for deenergizing said motor when the load on the motor increases so as to reduce the speed below the defined speed.

References Cited in the file of this patent

UNITED STATES PATENTS

| | | |
|---|---|---|
| 835,362 | Merrill | Nov. 6, 1906 |
| 1,611,102 | De Bell | Dec. 14, 1926 |
| 1,783,175 | Jordan | Dec. 2, 1930 |
| 2,193,634 | Lukens | Mar. 12, 1940 |
| 2,259,330 | Snyder | Oct. 14, 1941 |
| 2,346,341 | Werner | Apr. 11, 1944 |
| 2,592,492 | Trant | Apr. 8, 1952 |
| 2,667,611 | Rodianko | Jan. 26, 1954 |